Patented Oct. 13, 1931

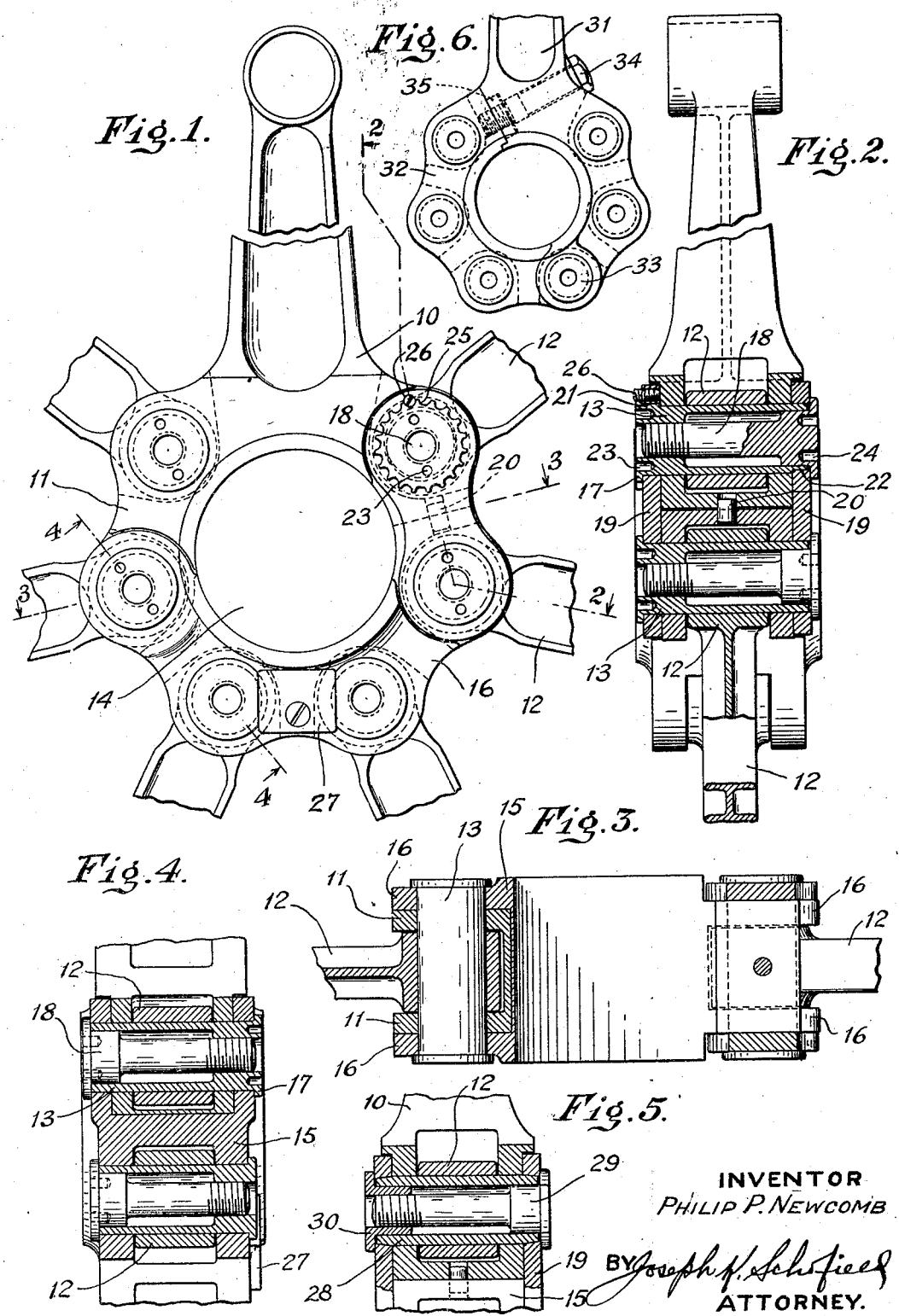

1,827,436

UNITED STATES PATENT OFFICE

PHILIP P. NEWCOMB, OF HARTFORD, CONNECTICUT, ASSIGNOR TO THE PRATT & WHITNEY AIRCRAFT COMPANY, OF HARTFORD, CONNECTICUT, A CORPORATION OF DELAWARE

CONNECTING ROD FOR RADIAL ENGINES

Application filed September 10, 1929. Serial No. 391,558.

This invention relates to connecting rods for engines and in particular to a master connecting rod for a radial type aircraft engine of the internal combustion type.

An object of the present invention is to provide an improved form of master connecting rod with a hinged strap member at its crank end adapted to enclose the crank pin of the engine, and, when released on one side, to permit removal of the rod directly from the crank shaft.

Another object of the invention is to provide improved fastening means for securing the hinged strap end of the master rod to the main portion thereof.

A still further object of the invention is to utilize one of the pins for connecting one of the articulating rods to the master rod as the pintle of the hinge connection for the strap member of the master rod, links being employed to hold the opposite side of the strap in position against the main portion of the master rod.

It is another object of importance of the invention to employ one or more of the pins for connecting the articulating rods to the master rod as retaining means for the links employed to retain the strap end of the master in its operative position.

And finally it is an object to so form one or both of the pins retaining these links in position so that the hinged strap member can be drawn tightly against the main portion of the master rod and rigidly maintained in that position.

With these and other objects in view, my invention consists in the features of construction and operation set forth in the following specification and illustrated in the accompanying drawings.

In the accompanying drawings annexed hereto and forming a part of this specification, I have shown my invention embodied in a connecting rod for a multi-cylinder engine of the radial type adapted primarily for aircraft, but it will be understood that the invention can be otherwise embodied and that the drawings are not to be construed as defining or limiting the scope of the invention, the claims appended to this specification being relied upon for that purpose.

In the drawings:

Figure 1 is a front elevation of the crank end of a master connecting rod provided with the present invention;

Fig. 2 is a side elevation of the master rod shown in Fig. 1, parts of the rod being shown in section taken upon the planes of the broken line 2—2 of Fig. 1;

Fig. 3 is a sectional view taken centrally through the crank end of the rod upon the plane of line 3—3 of Fig. 1;

Fig. 4 is a sectional view taken upon the plane of line 4—4 of Fig. 1;

Fig. 5 is a detail view in section of a slightly modified form of the invention; and Fig. 6 is a fragmentary side view of another modified form of the invention.

In the above mentioned drawings, I have shown several embodiments of the invention which are now deemed preferable, but it is to be understood that changes and modifications may be made within the scope of the appended claims without departing from the spirit of the invention.

Briefly, and in its broadest aspect, my invention comprises the following principal parts: First, a master connecting rod; second, a hinged strap member on the crank end adapted partially to surround the crank pin of the engine; third, a plurality of articulating rods pivotally connected individually to said master rod or its strap member; fourth, a hinge connecting the master rod and its strap member, the pintle of said hinge comprising one of the pins pivotally connecting an articulating rod to the master rod; fifth, links between the strap member and the master rod on the opposite side from the hinge connection, these links being held in position by means of articulating rod pins; and seventh, means for tightening the links to draw the strap member closely against the end of the main portion of the master rod.

Referring more in particular to the figures of the drawings, I provide a master connecting rod 10 with enlarged flanges 11 upon its crank end. These flanges are spaced apart and between them articulating rods 12 are pivotally connected by pins 13 passing through openings provided therefor in the flanges 11. This construction is generally similar to that now employed in aircraft engines having a radially disposed cylinder arrangement.

Heretofore the crank end of the master connecting rod 10 has usually been formed integrally, the crank shaft being made in two principal telescoping parts so that they can be assembled through the opening 14 provided in the rod 10 for the crank pin. In the present improved form of master rod the crank end is made in two closely associated parts. One half of the crank end is formed integrally with the master rod 10, the other half 15 being in the form of a strap hinged thereto in a manner presently to be described.

The hinged strap member 15 of the rod 10 has flanges 16 similar to flanges 11 of the rod. At one side of the rod 10 and hinged member 15 these flanges 11 and 16 are cut away as indicated in Fig. 3 so that they may overlap each other. A pin 13 extends through aligned openings in these cut away portions so that the member 15 may swing about the master rod 10 upon one of the pins 13. By this means the connecting rod 10 may have its crank end fitted about the crank pin of the engine after the crank has been mounted and finally assembled in place.

The pins 13 for pivotally attaching the articulating rods 12 and also that for forming the pintle for the hinge are preferably hollow as shown most clearly in Fig. 4. At one end is formed a small flange 17 limiting the movement of the pin 13 in one direction. Inserted within the opposite end of the pin 13 is a threaded stud 18 having a head adapted to lie against a portion of the flange on the hinge portion 15. This stud 18 threadedly engages internal threads within the pin 13.

In order to hold the strap portion 15 in position against the end of the main portion 10 of the master rod, links or straps 19 are provided. One of these straps 19 may be positioned on each face of the rod 10, preferably the flanges 11 and 16 being recessed slightly to accommodate the links. Holes are provided adjacent each end of the straps 19 through which pins 13 may extend and hold the straps in position. It will be noted that the straps 19 lie closely against the faces of the master rod 10 and strap member 15 hinged thereto and serve to keep these parts in correct alignment. A dowel pin 20 may also be provided entering the master rod 10 and the strap member 15 from the adjacent surfaces of these members.

To draw up the hinged strap member 15 against the rod 10 and hold these members firmly against each other or against shims introduced between them, special tightening means may be provided operating to force the links into their operative position. In Fig. 2 one means is illustrated in which one of the pins 13 in the master rod 10 is specially formed with eccentric surfaces. The portion of this pin shown at 21 which passes through the strap 19 adjacent the flange 17 of the pin 13 is formed eccentric to the portion passing through the flange 11 of the master rod 10. Similarly the opposite end of the pin 13 has an eccentric surface 22. This surface 22 is of smaller diameter than the eccentric surface 21 to enable the pin to be assembled in position through the links 19 but has its axis in alignment with the surface 21.

Rotation of this specially formed pin 13 with the eccentric surfaces 21 and 22 therefore serves to draw the surfaces of the master rod 10 and the hinged strap member 15 toward each other so that they are forced closely against each other. To effect this rotation of the pin 13 a wrench may be inserted in the small holes 23 in the flanged head 17 of the pin 13. Similar holes 24 are provided within the heads of the studs 18 for similarly tightening these studs 18 within their pins 13.

To hold the pin 13 with the eccentric surfaces 21 and 22 in its adjusted rotative position, arcuate notches or recesses may be cut in the periphery of its flange 17 as shown at 25. When this pin 13 has been rotated to its final assembled position, a screw 26 may be threaded into the flange 11 of the rod. This screw 26 will engage within one of the recesses 25, thus preventing rotation of this pin from its final adjusted position. The remaining pins may be prevented from rotating by the usual plates 27 disposed between adjacent pins, the heads of the pins being milled off as shown.

Fig. 5 shows another means for drawing the hinged strap member 15 against the master rod. In this embodiment a pin 28 fitting the holes in the flanges 11 of the master rod 10 and fitting also the articulating rod 12 in the usual manner has its ends tapered slightly as shown. The ends of the links 19 fitting over this pin 28 have their holes correspondingly tapered. The length of the links 19 between the holes for the pins 13 and 24 is of exactly the proper length to draw the strap member 15 against the rod 10 when they are in their final position.

To draw the links 19 together a stud or screw 29 is provided having a head engaging the outer face of the strap 19. A nut 30 engages the inner end of the screw 29 and is flanged so that it engages over the link 19 on the opposite side.

In Fig. 6 is shown another modified form of the invention in which some of the objects of the invention are obtained. The master rod 31 has a hinged strap member 32 hinged by means of one of the pins 33 for pivotally connecting the articulating rods, not shown. This strap portion 32 has its free end held against the master rod 31 by means of a bolt or screw 34. To rigidly hold the strap member 32 in position and against lateral movement, a boss 35 is provided on the strap member 32 which enters a correspondingly formed recess in the master rod 31.

What I claim is:

1. A connecting rod construction comprising in combination, a master rod, a strap member on one end of said master rod, a plurality of articulating rods, pins pivotally connecting said articulating rods to said master rod and to said strap member, a hinge connection between said master rod and strap member on one side of said strap member, one of said pins forming the pintle of said hinge, and means connecting the opposite side of said strap member to said master rod.

2. A connecting rod construction comprising in combination, a master rod, a strap member on one end of said master rod, a plurality of articulating rods, pins pivotally connecting said articulating rods to said master rod and to said strap member, a hinge connection between said strap member and master rod on one side, and link members connecting the opposite side of said strap member to said master rod.

3. A connecting rod construction comprising in combination, a master rod, a strap member on one end of said master rod, a plurality of articulating rods, pins pivotally connecting said articulating rods to said master rod and to said strap member, a hinge connection between said strap member and master rod on one side of said strap member, and link members connecting the opposite side of said strap member to said master rod, said links being held in place by pins for said articulating rods upon said master rod and strap member.

4. A connecting rod construction comprising in combination, a master rod, a strap member on one end of said master rod, a plurality of articulating rods, pins pivotally connecting said articulating rods to said master rod and to said strap member, a hinge connection between said strap member and master rod on one side, and link members connecting the opposite side of said strap member to said master rod, said links being mounted on adjacent pins for connecting articulating rods to said master rod and to said strap member.

5. A connecting rod construction comprising in combination, a master rod, a strap member on one end of said master rod, a plurality of articulating rods, pins pivotally connecting said articulating rods to said master rod and to said strap member, a hinge connection between said strap member and master rod on one side, and link members connecting the opposite side of said strap member to said master rod, said links being mounted on adjacent pins for connecting articulating rods to said master rod and to said strap member, one of said pins mounting said links having eccentric surfaces whereby rotation of said latter pin will force said strap member against the end of said master rod.

6. A connecting rod connection comprising in combination, a master rod, a strap member on one end of said master rod, connections on said master rod and strap member adapted to pivotally attach articulating links individually thereto, and means connecting said master rod and strap member rigidly together, said means including links extending between said master rod and strap member and engaging over connections for said articulating links.

7. A connecting rod connection comprising in combination, a master rod, a strap member on one end of said master rod, connections on said master rod and strap member adapted to pivotally attach articulating links individually thereto, and means connecting said master rod and strap member rigidly together, said means including overlapping portions on said master rod and said strap member and having a connection for an articulating link passing therethrough.

In testimony whereof, I hereto affix my signature.

PHILIP P. NEWCOMB.